United States Patent
Azizi et al.

(10) Patent No.: US 9,510,346 B2
(45) Date of Patent: Nov. 29, 2016

(54) MASTER STATION AND METHOD FOR HIGH-EFFICIENCY WI-FI (HEW) COMMUNICATION USING TRAVELING PILOTS

(71) Applicant: Intel IP Corporation, Santa Clara, CA (US)

(72) Inventors: Shahrnaz Azizi, Cupertino, CA (US); Thomas J. Kenney, Portland, OR (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 82 days.

(21) Appl. No.: 14/227,085

(22) Filed: Mar. 27, 2014

(65) Prior Publication Data

US 2015/0139089 A1 May 21, 2015

Related U.S. Application Data

(60) Provisional application No. 61/906,059, filed on Nov. 19, 2013.

(51) Int. Cl.
*H04W 4/00* (2009.01)
*H04W 72/04* (2009.01)
(Continued)

(52) U.S. Cl.
CPC ......... *H04W 72/044* (2013.01); *H04B 7/0452* (2013.01); *H04L 5/0007* (2013.01);
(Continued)

(58) Field of Classification Search
CPC ............. H04W 4/008; H04W 72/044; H04W 72/0413; H04W 84/12; H04B 1/76; H04B 7/0452; H04L 5/0007; H04L 27/2602; H04L 27/2613; H04L 5/0048

USPC ................ 370/329, 330, 335, 336, 337, 338
See application file for complete search history.

(56) References Cited

U.S. PATENT DOCUMENTS

| | | | |
|---|---|---|---|
| 2010/0290449 A1 | 11/2010 | Van Nee et al. | |
| 2011/0299468 A1 | 12/2011 | Van Nee et al. | |

(Continued)

FOREIGN PATENT DOCUMENTS

| CN | 105659550 A | 6/2016 |
|---|---|---|
| WO | WO-2013122301 A1 | 8/2013 |
| WO | WO-2015076965 A1 | 8/2013 |

OTHER PUBLICATIONS

U.S. Appl. No. 61/870,711.*

(Continued)

*Primary Examiner* — Chuong T Ho
(74) *Attorney, Agent, or Firm* — Schwegman Lundberg & Woessner, P.A.

(57) ABSTRACT

Embodiments of a master station and method for high-efficiency Wi-Fi (HEW) communication using traveling pilots are generally described herein. In some embodiments, the master station is arranged for communicating with a plurality of HEW and may be configured to transmit, during an initial portion of an HEW control period, a master-sync transmission that includes a multi-device HEW preamble arranged to signal and identify data fields for a plurality of scheduled HEW stations. The master station may transmit during the HEW control period the data fields with traveling pilots to the scheduled HEW stations. The master station may also receive data fields with traveling pilots transmitted by the scheduled HEW stations during the HEW control period. The traveling pilots may comprise pilot signals that are shifted among orthogonal-frequency multiplexed (OFDM) subcarriers during transmission of one or more of the data fields.

22 Claims, 7 Drawing Sheets

(51) Int. Cl.
*H04L 5/00* (2006.01)
*H04L 27/26* (2006.01)
*H04B 7/04* (2006.01)
*H04W 84/12* (2009.01)

(52) U.S. Cl.
CPC ......... *H04L5/0048* (2013.01); *H04L 27/2602* (2013.01); *H04L 27/2613* (2013.01); *H04W 4/008* (2013.01); *H04W 72/0413* (2013.01); *H04W 84/12* (2013.01)

(56) References Cited

U.S. PATENT DOCUMENTS

| | | | |
|---|---|---|---|
| 2013/0223359 A1 | 8/2013 | Kenney et al. | |
| 2014/0328313 A1* | 11/2014 | Merlin | H04L 1/18 370/330 |
| 2014/0362935 A1* | 12/2014 | Porat | H04L 27/2602 375/260 |
| 2015/0023325 A1* | 1/2015 | Wetterwald | H04L 5/0055 370/336 |
| 2015/0023335 A1* | 1/2015 | Vermani | H04B 7/0452 370/338 |
| 2015/0063327 A1* | 3/2015 | Barriac | H04W 56/0005 370/337 |
| 2016/0143010 A1* | 5/2016 | Kenney | H04W 4/008 370/330 |

OTHER PUBLICATIONS

U.S. Appl. No. 61/892,946.*
U.S. Appl. No. 61/847,386.*
U.S. Appl. No. 61/819,096.*
U.S. Appl. No. 61/846,579.*
International Application Serial No. PCT/US2014/061549, International Preliminary Report on Patentability mailed Jun. 2, 2016, 7 pgs.
International Application Serial No. PCT/US2014/061549, International Search Report mailed Jan. 26, 2015, 3 pgs.
International Application Serial No. PCT/US2014/061549, Written Opinion mailed Jan. 26, 2015, 5 pgs.
Chun, Jinyoung, et al., "Legacy Support on HEW frame", IEEE 11-13/1057r0, (Sep. 16, 2013), 8 pgs.

* cited by examiner

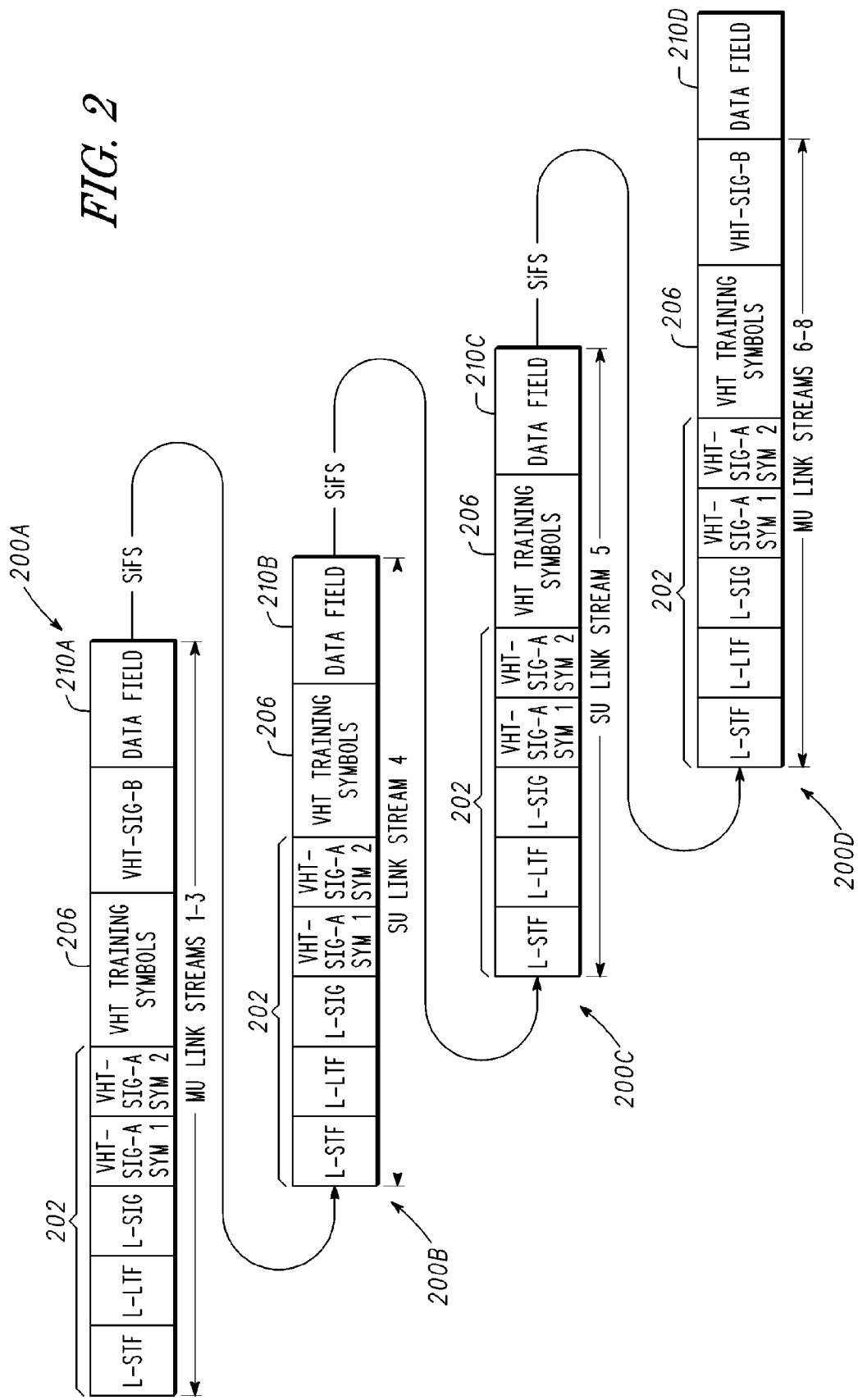

US 9,510,346 B2

MASTER STATION AND METHOD FOR HIGH-EFFICIENCY WI-FI (HEW) COMMUNICATION USING TRAVELING PILOTS

PRIORITY CLAIM

This application claims the benefit of priority under 35 U.S.C. 119(e) to U.S. Provisional Patent Application Ser. No. 61/906,059, filed Nov. 19, 2013, which is incorporated herein by reference in its entirety.

TECHNICAL FIELD

Embodiments pertain to wireless networks. Some embodiments relate to Wi-Fi networks and networks operating in accordance with one of the IEEE 802.11 standards. Some embodiments relate to high-efficiency wireless or high-efficiency Wi-Fi (HEW) communications.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements. The frame structure used for conventional and legacy IEEE 802.11 communications including legacy very-high throughput (VHT) communications may be less suitable for such high-density deployment situations due to its high overhead.

For example, one issue with these conventional communication techniques is that a preamble is sent for every packet transmission irrespective of which devices are communicating and when they last communicated with each other. This high overhead becomes more significant in high-density deployment situations particularly for devices that have low to moderate data rate requirements.

Thus, there are general needs for devices and methods that improve overall system efficiency in wireless networks, particularly for high-density deployment situations. There are also general needs for devices and methods suitable for HEW communications. There are also general needs for devices and methods suitable for HEW communications that can coexist with legacy devices.

BRIEF DESCRIPTION OF THE DRAWINGS

FIG. 2 illustrates several packet transmissions in accordance with some conventional techniques;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
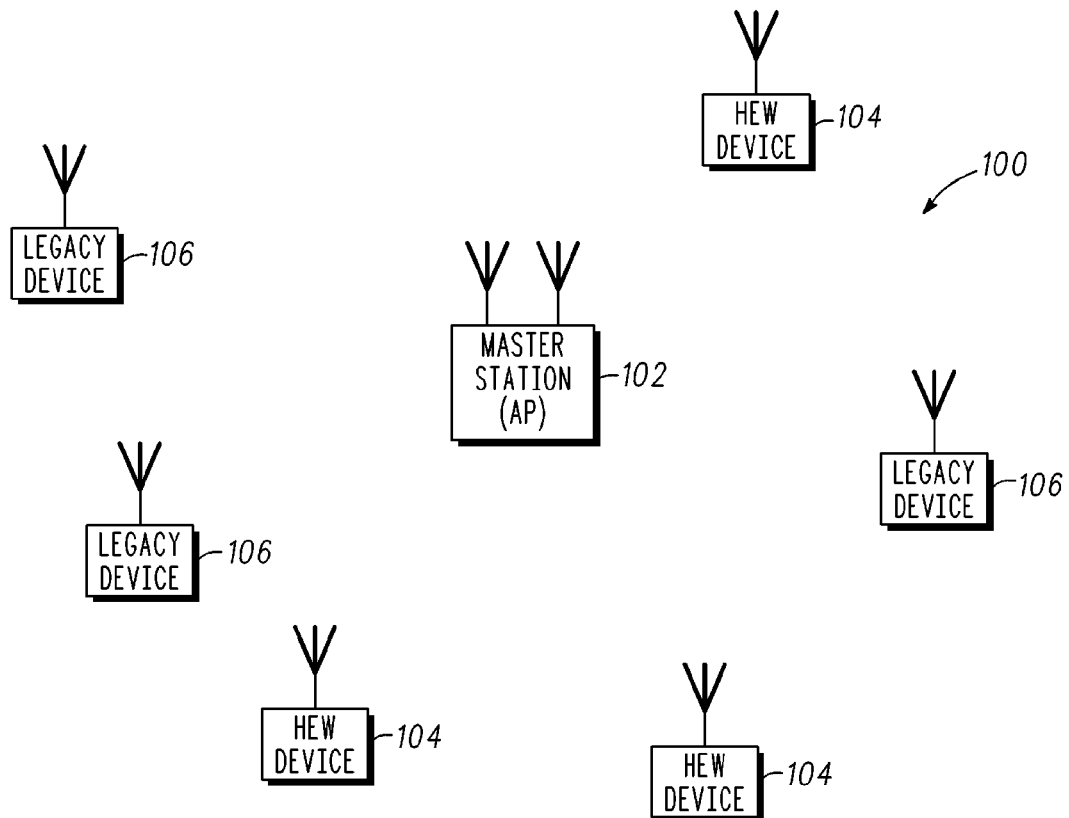
FIG. 1 illustrates a High Efficiency Wi-Fi (HEW) network in accordance with some embodiments.

FIG. 1 illustrates an HEW network in accordance with some embodiments. HEW network 100 may include a master station (STA) 102, a plurality of HEW stations 104 (i.e., HEW devices), and a plurality of legacy stations 106 (legacy devices). The master station 102 may be arranged to communicate with the HEW stations 104 and the legacy stations 106 in accordance with one or more of the IEEE 802.11 standards. In some embodiments, the master station 102 may be an access point (AP), although the scope of the embodiments is not limited in this respect.

In accordance with embodiments, the master station 102 may include physical layer (PHY) and medium-access control layer (MAC) circuitry which may be arranged to contend for a wireless medium (e.g., during a contention period) to receive exclusive control of the medium for an HEW control period (i.e., a transmission opportunity (TXOP)). The master station 102 may transmit an HEW master-sync transmission at the beginning of the HEW control period. During the HEW control period, the HEW stations 104 may communicate with the master station 102 in accordance with a non-contention based multiple-access technique. This is unlike conventional Wi-Fi communications in which devices communicate in accordance with a contention-based communication technique, rather than a non-contention multiple-access technique. During the HEW control period, legacy stations 106 refrain from communicating. In some embodiments, the master-sync transmission may be referred to as an HEW control and schedule transmission.

In accordance with embodiments, the master-sync transmission may include a multi-device HEW preamble arranged to signal and identify data fields for a plurality of scheduled HEW stations 104. The master station 102 may further be arranged to transmit (in the downlink direction) and/or receive (in the uplink direction) one or more of the data fields with traveling pilots to/from the scheduled HEW stations 104 during the HEW control period. The traveling pilots may comprise pilot signals that are shifted among orthogonal-frequency multiplexed (OFDM) subcarriers during transmission of one or more of the data fields.

In these embodiments, the master station 102 may include training fields in the multi-device HEW preamble to allow each of the scheduled HEW stations 104 to perform an initial channel estimate. The traveling pilots may be used by the scheduled HEW stations 104 to update these initial channel estimates. These embodiments are described in more detail below. Similarly, in the uplink direction, the master station 102, which may have already performed initial channel estimation on prior uplink transmissions from HEW stations 104, may use traveling pilots to update the channel estimates as it receives uplink transmissions from HEW stations 104 during the HEW control period.

In accordance with some embodiments, an HEW station 104 may be a Wi-Fi or IEEE 802.11 configured station (STA) that is further configured for HEW operation. An HEW station 104 may be configured to communicate with a master station 102 in accordance with a scheduled orthogonal frequency division multiple access (OFDMA) technique during the HEW control period and may be configured to receive and decode the multi-device HEW preamble of an HEW frame. An HEW station 104 may also be configured to decode an indicated data field received by the master station 102 during the HEW control period.

In accordance with some embodiments, the master station 102 may be arranged to select a number of long-training fields (LTFs) to be included in the multi-device HEW preamble of an HEW frame. The HEW frame may comprise a plurality of links for transmission of a plurality of data streams. The master station 102 may also transmit the selected number of LTFs sequentially as part of the multi-device HEW preamble and transmit a plurality of data fields sequentially to each of a plurality of scheduled HEW stations 104. The data fields may be part of the HEW frame. Each data field may correspond to one of the links and may comprise one or more data streams. In some embodiments, the data fields may be referred to as packets. The master station 102 may also be arranged receive packets from HEW stations 104 in the uplink direction during the HEW control period.

In some embodiments, the selection of the number of LTFs to be included in the multi-device HEW preamble may be based on a maximum number of streams to be transmitted on a single link. In some embodiments, the selection of the number of LTFs to be included in the multi-device HEW preamble may be based on a scheduled HEW station 104 with a greatest channel estimation need (e.g., the scheduled HEW station 104 receiving the greatest number of streams on a single link). In some embodiments, the selection of the number of LTFs to be included in the multi-device HEW preamble may be based on the sum of greatest number of streams on each single link that scheduled HEW stations 104 would receive. In some embodiments, the number of LTFs to be included in the multi-device HEW preamble may be predetermined. In these embodiments, the number of LTFs to be included in the multi-device HEW preamble may be based on the maximum number of streams that can be transmitted on a single link.

In some embodiments, the master station 102 may be arranged to configure the multi-device HEW preamble include an HEW control signal field (HEW-CNTR-SIG) to identify and signal each of the data fields of the HEW frame. In these embodiments, a single HEW preamble is included in an HEW frame, which is unlike conventional techniques which include a preamble for each link.

In these embodiments, the HEW master-sync transmission that is transmitted at the beginning of the HEW control period may include the multi-device HEW preamble. The data fields of the HEW frame may be transmitted by the master station 102 after the multi-device HEW preamble within the HEW control period in the downlink direction and/or received by the master station 102 in the uplink direction.

FIG. 2 illustrates several packet transmissions in accordance with some conventional techniques. FIG. 2 illustrates packet transmission 200A for a first link, packet transmission 200B for a second link, packet transmission 200C for a third link, and packet transmission 200D for a fourth link. In the example illustrated, packet transmission 200A may be for a multi-user (MU) link and may include three streams (streams 1-3) that are included in data field 210A for different users. Packet transmission 200B may be for a single-user (SU) link and may include a single stream (stream 4) that is included in data field 210B. Packet transmission 200C may be for a SU link and may include a single stream (stream 5) that is included in data field 210C. Packet transmission 200D may be for a MU-MIMO link and may include three streams (streams 6-8) that are included in data field 210D. A short inter-frame spacing (SiFS) and/or contention period may be provided between these packet transmissions (e.g., between packet transmissions 200A and 200B, between packet transmissions 200B and 200C, and between packet transmissions 200C and 200D).

As illustrated, preamble 202 is transmitted for each packet transmission irrespective of which devices are communicating and irrespective when they last communicated with each other. The transmission of preamble 202 for each packet transmission reduces system efficiency. VHT training symbols 206 may be part of preamble 202 and are transmitted before each data field of each packet transmission, further reducing system efficiency.

In accordance with some embodiments, the master station 102 may use a control packet (e.g., a master-sync transmission) which has a training field for channel estimation along with a single PHY signal field (SIG) to signal all scheduled HEW stations 104 at one time at the beginning of a scheduled exchange. This control transmission preamble may include a training field sufficient that all scheduled HEW stations 104 may be able to utilize it for channel estimation in a subsequent sequence of data fields. In addition, the single PHY SIG field may be included to reduce the overhead instead of having a SIG field before each data field to each scheduled HEW station 104. These embodiments may eliminate repetitive training fields and may reduce signal field signaling overhead. Additionally, these embodiments may allow both SU and MU-MIMO links to be included as part of the HEW scheduled transmission. These embodiments may greatly reduce the overhead for these scheduled HEW exchanges.

In accordance with some of these embodiments, the multi-device HEW preamble may be configured to include sufficient training fields in the initial control packet for all scheduled HEW stations 104 that will be involved during a scheduled interval event to use for channel estimation. Additionally, the initial SIG field in the initial control packet may be configured to provide all the PHY signaling to the other scheduled HEW stations 104 in subsequent data packets or fields. During a scheduled interval, an HEW master device (e.g., master station 102) may communicate with multiple scheduled HEW stations 104. These transmissions can be SU or MU transmissions or a combination of both, and can be in the downlink or the uplink direction. In these embodiments, the master station 102 gains access to the medium and may use a schedule to allow HEW stations 104 to communicate. Since the master station 102 may include a sufficient number of LTFs in the initial transmission so all HEW scheduled stations 104 in the scheduled transmission can attain a channel estimate, there is no need for the master station 102 to provide a training field for each scheduled HEW station 104 independently.

There currently is no conventional mechanism to transmit to multiple devices sequentially (both SU and MU) in one scheduled period of time while providing one set of training fields along with a compact SIG field for all receivers. For high density deployment scenarios, removing or reducing fixed portions of a packet will improve overall efficiency.

Conventionally, an access point sends a frame with a preamble to each of the devices in order to allow a device (e.g., legacy station 106) to demodulate the signal. The preamble may be based on the device configuration (e.g., the number of antennas) and the transmit mode such as the number of streams, the space-time block code (STBC), whether the link is a SU or a MU-MIMO link, etc. In the case of a MU-MIMO link, multiple devices may be configured by one preamble. In accordance with embodiments, the master station 102, during its initial transmission, may use a sufficient number of LTFs to match the requirement of the particular scheduled HEW station 104 (or devices in the case of a MU-MIMO transmission) with the maximum need. For example, if there are four links in a HEW scheduled exchange, the first link may be using a MU-MIMO transmission (consisting of three users each with one stream for a total of three streams from the master), the second and third links may be SU links with one stream each, and the fourth link may be a MU-MIMO link with three streams (e.g., three users with one stream each). In this example, the maximum number of streams for a link is three streams requiring three LTFs in the multi-device HEW preamble. Since only one preamble is used for all four links instead of one preamble for each link, the efficiency improvement becomes substantial.

An additional benefit comes to the scheduled HEW stations 104 that have lower transmit modes and may require less LTFs than provided in the multi-device HEW preamble. For those devices, the extra LTFs may be used for improved channel estimates resulting in more robust operation for those links. All devices may be aware of how many LTFs are in this initial transmission from a first HEW-SIG, for example, which may carry this information. Additionally, another embodiment may use the N-STS (number of Space-Time-Streams) in the VHT-SIG to signal to all scheduled HEW stations 104 the number of LTFs. Thus, the initial transmission, which is to be received by all scheduled HEW stations 104 for that resource allocation time, will contain sufficient number of LTFs so a channel estimate can be made sufficient to demodulate all transit modes for all devices.

Additionally, to save the overhead of having independent signal fields for the transmission to each link, all this signaling may be done at the beginning of the scheduled transmission by the master station 102 in the master-sync transmission. The VHT SIG A may be used for the SU transmissions and the VHT SIG A and SIG B may be used for the MU-MIMO transmission, although this is not a requirement. In some embodiments, several bits may be eliminated where there is redundancy between the different link transmissions. For example, bits that are the same for all the scheduled HEW stations 104 in a scheduled transmission may be eliminated. In some embodiments, the master station 102 may group like devices with like parameter configurations to minimize signaling overhead. Thus these bits would not repeated in signaling to each scheduled HEW station 104 providing additional savings. At a minimum, only one use of the cyclic-redundancy check (CRC) and tail bits along with any reserved bits may be required. Some of these embodiments may save at least 16 bits for each link in the transmission to help provide a more compact HEW SIG and eliminate the need for separate signal fields prior to each link transmission.

Figure 3:
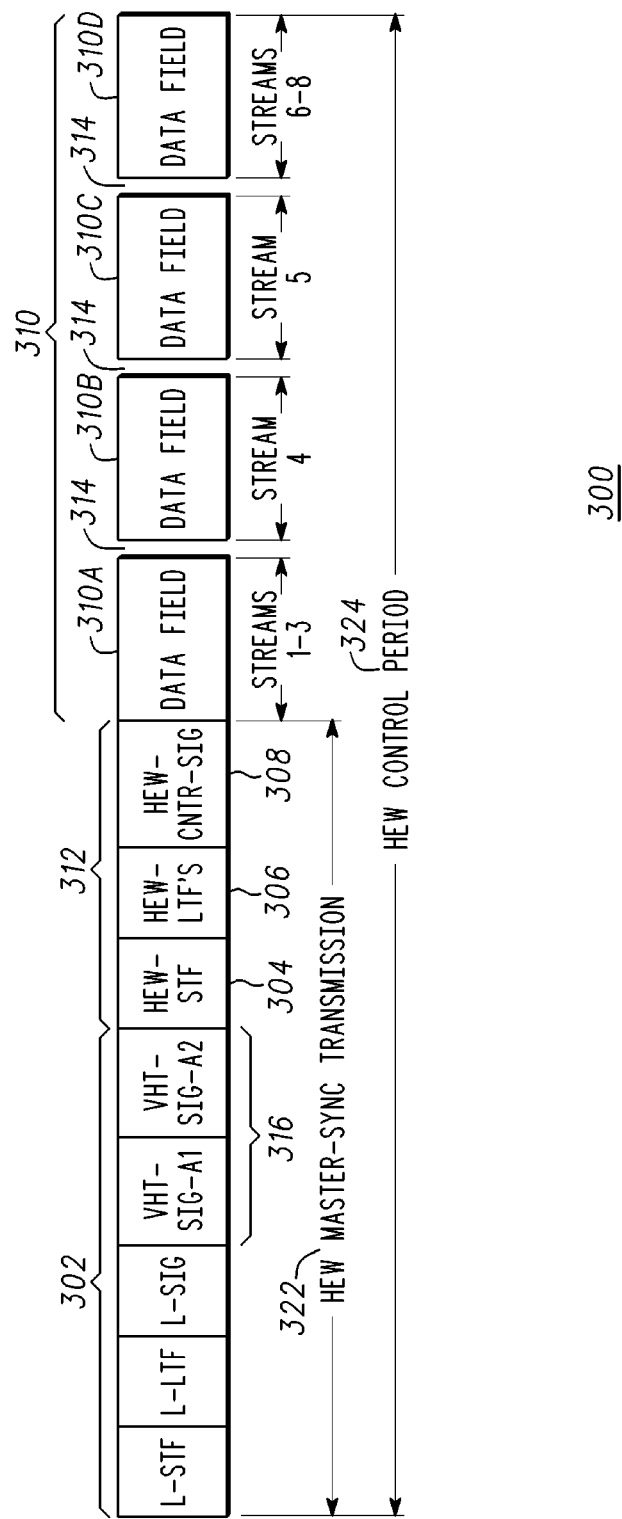
FIG. 3 illustrates an HEW transmission in accordance with some embodiments.

FIG. 3 illustrates an HEW transmission in accordance with some embodiments. HEW frame 300 may include a legacy preamble 302, an HEW preamble 312 and a plurality of data fields 310. Each data field 310 may correspond to a link and may include one or more streams. One or more of the data fields 310 may include traveling pilots as described in more detail below.

In the example illustrated, data field 310A may be for a MU link and may include three streams (streams 1-3) for three users, data field 310B may be for a SU link and may include a single stream (stream 4) for a single user, data field 310C may also be for a SU link and may include a single stream (stream 5) for a single user, and data field 310D may be a MU link and may include three streams (streams 6-8) for three users. In this example, HEW frame 300 may carry the same number of links and streams as the transmission illustrated in FIG. 2, but with significantly less overhead. This is discussed in more detail below.

In accordance with embodiments, a number of long-training fields (LTFs) may be included in the multi-device HEW preamble 312. The number may be selected based on maximum number of streams to be transmitted on a single link that is included in the HEW frame 300. In these embodiments, the selection of the number of LTFs to be included in the multi-device HEW preamble 312 may be based on a scheduled HEW station 104 with a greatest channel estimation need, which may be the station receiving the greatest number of streams on a single link.

In some embodiments, the master station 102 may configure the multi-device HEW preamble 312 to include the number of LTFs in an LTF portion 306 of the multi-device HEW preamble 312. The master station 102 may also configure the multi-device HEW preamble 312 to include an HEW control signal field (HEW-CNTR-SIG) 308 to follow the LTF portion 306.

In some embodiments, the master station 102 may also configure the multi-device HEW preamble 312 to include an HEW short training field (HEW-STF) 304 in the multi-device HEW preamble 312, although this is not a requirement. In some alternate embodiments, the master station 102 may configure the multi-device HEW preamble 312 without an HEW short training field. In some embodiments, the HEW-STF 304 is optional.

In some embodiments, each LTF included in the multi-device HEW preamble 312 may comprise a long-training sequence. The long-training sequence may be repeated a number of times, once for each LTF that is included in the LTF portion 306 of the multi-device HEW preamble 312.

The master station 102 may also configure the HEW frame 300 to include the legacy preamble 302 to precede the multi-device HEW preamble 312 for backwards compatibility. The legacy preamble 302 of the HEW frame 300 is arranged to be detected by legacy stations 106 to cause the legacy stations 106 to refrain from transmitting during the HEW control period 324.

In accordance with embodiments, a single HEW preamble (i.e., the multi-device HEW preamble 312) is included in the HEW frame 300 for all links, which is unlike conventional techniques which include a preamble for each link. For example, as illustrated in FIG. 2, each link utilizes a separate preamble (i.e., the omni-directional portion of the preamble 202) and separate training symbols (i.e., VHT training symbols 206) for each link.

In some embodiments, the initial portion of the HEW frame 300 (e.g., legacy preamble 302 and multi-device HEW preamble 312) may be an HEW master-sync transmission 322, which may be considered an HEW control and schedule transmission or an HEW control packet that is transmitted at the beginning of the HEW control period 324.

In accordance with some embodiments, the HEW-CNTR-SIG 308 may be configured by the master station 102 for identifying and signaling each of the links of the HEW frame 300. In some embodiments, the HEW-CNTR-SIG 308 may be configured to indicate modulation parameters for each of the links (e.g., a modulation and/or coding scheme (MCS)), identify an encoding type (e.g., either convolutional or LDPC encoding) for each of the links, and/or identify whether each link associated with a particular data field 310 is a SU link or MU link. The HEW-CNTR-SIG 308 may also be configured to identify a number of spatial streams for each link. In some embodiments, the HEW-CNTR-SIG 308 may also include a CRC and tail bits (e.g., to flush out the decoder). In some embodiments, a MU link may be a MU-MIMO link, although this is not a requirement. In some embodiments, the HEW-CNTR-SIG 308 may also include scheduling information for uplink transmissions by HEW devices 104. In other embodiments, the HEW-CNTR-SIG 308 may also include scheduling information for multiple access.

In accordance with embodiments, each data field 310 may be associated with either a SU link or a MU link and each link may be configurable to provide multiple spatial streams of data. Although the example HEW frame 300 is illustrated with four data fields corresponding to four links, the scope of the embodiments is not limited in this respect. In some embodiments, as few as one data field 310 may be provided. In other embodiments, up to ten or more data fields 310 may be provided depending on the length of the HEW control period 324.

In some embodiments, the master station 102 may provide a guard time 314 between the data fields 310 of the HEW frame 300, although the scope of the embodiments is not limited in this respect. In other embodiments, no guard time may be provided between the data fields 310 of the HEW frame 300. In some embodiments, the guard time 314 may be a SiFS, although this is not a requirement.

In some alternate embodiments, instead of a plurality of data fields 310, the HEW frame 300 may include a single data field that may be configured as a multi-user data field. In these embodiments, the multi-user data field may be shared by multiple scheduled HEW stations 104. For example, the multi-user data field may be configured as a MU-MIMO transmission with several spatial streams, each utilizing the same frequency subcarriers. Alternatively, the multi-user data field may utilize different resources (e.g., either different block of OFDM subcarriers or resource blocks) allocated to different users. In these embodiments, the HEW-CNTR-SIG 308 may be arranged to provide signaling for a multi-user data field.

In some embodiments, the master station 102 may provide an indication of the number of LTFs that are included in the LTF portion 306 of the multi-device HEW preamble 312. In some embodiments, the indication of the number of LTFs that are included in the LTF portion 306 of the multi-device HEW preamble 312 may be provided in the legacy preamble 302 (e.g., in a legacy signal field such as the L-SIG). In some embodiments, the indication of the number of LTFs that are included in the LTF portion 306 of the multi-device HEW preamble 312 may be provided in a VHT signal field 316 (e.g., VHT-SIG A1, VHT-SIG A2) of the legacy preamble 302, although the scope of the embodiments is not limited in this respect.

In some alternate embodiments, the indication of the number of LTFs that are included in the LTF portion 306 of the multi-device HEW preamble 312 may be provided in a HEW signal field, such as the HEW-CNTR-SIG 308. In some of these alternate embodiments, the HEW-CNTR-SIG 308 may precede the LTF portion 306 in the multi-device HEW preamble 312.

In some embodiments, the legacy preamble 302 may include a legacy short-training field (L-STF), a legacy long-training field (L-LTF) and a legacy signal field (L-SIG). In some embodiments, the legacy preamble 302 may also include the legacy VHT signal field 316, although this is not a requirement as in some embodiments, the legacy preamble 302 would not include the legacy VHT signal field 316. In some embodiments, the legacy VHT signal field 316 is optional.

In accordance with embodiments, a VHT-SIG-B is not needed HEW frame 300. A VHT-SIG-B is included in packet transmission 200A (FIG. 2) and packet transmission 200D (FIG. 2) to provide signaling for the corresponding MU links. In accordance with embodiments, the HEW-CNTR-SIG 308 may be configured to include information for identifying and signaling each of the links in HEW frame 300.

In accordance with embodiments, the LTFs that are included in HEW preamble 312 are to be used by the scheduled HEW stations 104 for channel estimation. In these embodiments, the scheduled HEW stations 104 that are receiving multiple streams may need to utilize at least as many LTFs as the number of streams for their channel estimate. Since the number of LTFs included in the multi-device HEW preamble 312 may be equal to the maximum number of streams to be transmitted on a single link, some scheduled HEW stations 104 will receive more LTFs than needed for their channel estimate allowing these devices to generate an improved channel estimate. In some embodiments, these devices may not utilize the information on the extra LTFs.

In some embodiments, the links of an HEW frame 300 may be configurable to have the same bandwidth. The bandwidth may be one of 5 MHz, 10 MHz, 20 MHz, 40 MHz, 80 MHz or 160 MHz, although the scope of the embodiments is not limited in this respect. In some embodiments, a 320 MHz bandwidth may be used. In these embodiments, each link of an HEW frame 300 may be configured for transmitting a number of spatial streams and the number of LTFs included in the multi-device HEW preamble 312 may be equal to the maximum number of streams that is transmitted on a single link.

In some embodiments, the link bandwidth may be unrelated to the number of streams transmitted or whether the link is a SU or MU link. For example, a 20 MHz link may be either SU link or a MU link. A 20 MHz SU link for example, may be used to transmit several spatial streams (e.g., up to four or more) to a single HEW station 104. A 20 MHz MU link for example, may be used to transmit several spatial streams (e.g., up to four or more) to several HEW stations 104.

In some embodiments, the master station 102 may initially contend for the wireless medium during a contention period to receive control of the medium for the HEW control period 324. The master station 102 may transmit the HEW frame 300 during the HEW control period. During the HEW control period 324, the master station 102 has exclusive use of the medium for communication with scheduled HEW stations 104 in accordance with a non-contention based multiple-access technique.

In some embodiments, the multiple-access technique used during the HEW control period 324 may be a scheduled OFDMA technique, although this is not a requirement. In some embodiments, the multiple-access technique may be a time-division multiple access (TDMA) technique or a frequency division multiple access (FDMA) technique.

The master station 102 may also communicate with legacy stations 106 (FIG. 1) in accordance with legacy IEEE 802.11 communication techniques. In some embodiments, the master station 102 may also be configurable communicate with HEW stations 104 outside the HEW control period 324 in accordance with legacy or conventional IEEE 802.11 communication techniques, although this is not a requirement.

The HEW packet structure for HEW frame 300 outlined above provides the benefit of increased PHY efficiency for HEW communication. The key aspects are that this HEW packet structure is that a separate preamble (i.e., legacy preamble 202) and separate training symbols (i.e., VHT training symbols 206) are not required for each link. This significantly increases PHY efficiency with no loss in performance. Additionally, as outlined above, devices with lower transmit modes (HEW stations 104 needing fewer LTFs then used in the multi-device HEW preamble 312) will benefit from improved channel and parameter estimation then would be the case in a conventional packet exchange. Additionally, selecting a single signal field (i.e., HEW-CNTR-SIG 308) ahead of time may allow for better assignment of the bits and opens up the ability of optimizing its use.

In accordance with embodiments, one or more data fields 310 may be transmitted during the HEW control period 324 with traveling pilots to the scheduled HEW stations 104. The traveling pilots may comprise pilot signals that are shifted among the OFDM subcarriers during transmission of one or more of the data fields 310. The training fields in the multi-device HEW preamble 312 allow each of the scheduled HEW stations 104 to perform an initial channel estimate. The traveling pilots allow the scheduled HEW stations 104 to update the initial channel estimates.

In other embodiments, traveling pilots are used in uplink transmission that are received and processed by master station 102. In these embodiments, scheduled HEW stations 104 may include traveling pilots in their transmissions to the master station 102 during the HEW control period 324.

Since the traveling pilots, when transmitted by the master station 102, allow scheduled HEW stations 104 to update their channel estimates for receipt of data fields 310, the transmissions to the individual stations (i.e., the data fields 310) do not require a separate preamble to allow the stations to maintain PER performance. Accordingly, only a single preamble (i.e., the multi-device HEW preamble 312) at the beginning of the master-sync transmission 322 is needed. This provides a significant reduction in overhead and substantial efficiency improvement.

Figure 4:
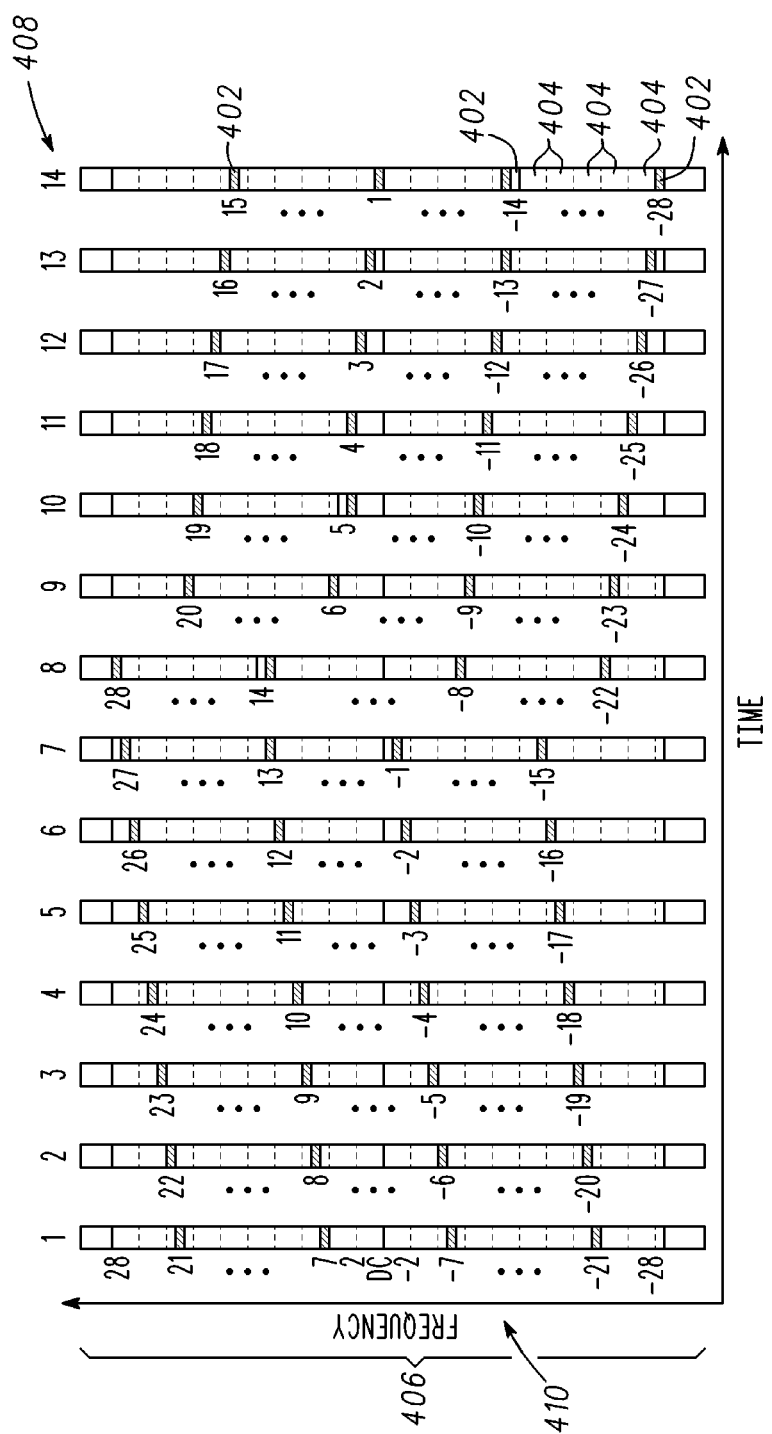
FIG. 4 illustrates sequentially-shifted traveling pilots in accordance with some embodiments.

FIG. 4 illustrates sequentially-shifted traveling pilots in accordance with some embodiments. The time-frequency structure illustrated in FIG. 4 comprises a plurality of OFDM subcarriers 410 in the frequency dimension and a plurality of OFDM symbols 408 in the time dimension. This time-frequency structure may be used to represent one data field 310 (FIG. 3) or a portion of a data field 310. The time-frequency structure illustrated in FIG. 4 may be extended in time and may be used to represent more of data fields 310. The channel bandwidth 406 may represent the bandwidth of the data fields 310 of the HEW frame 300 (FIG. 3). Each data field 310 may be a packet and may comprise a plurality of symbols 408. Traveling pilots 402 may be included within data fields 310 (FIG. 3). In this example embodiment, the traveling pilots 402 are shifted sequentially among the OFDM subcarriers 410 from one symbol 408 to another symbol 408 in time within a data field 310 (i.e., shifted sequentially by one or more subcarriers for every symbol as illustrated in FIG. 4).

In these embodiments, a pilot signal may be shifted by a predetermined number of subcarriers for each subsequent symbol (i.e., as a function of time). In the example illustrated in FIG. 4, pilot signals are transmitted on subcarriers 21, 7, −7 and −21 during symbol #1. During symbol #2, pilot signals are shifted by one subcarrier and are transmitted on subcarriers 22, 8, −6 and −20. A sequential shift may be repeated for all symbols of data field as illustrated in FIG. 4. In the example illustrated in FIG. 4, a data field is illustrated as having only 14 symbols in time and 56 subcarriers in frequency, although the scope of the embodiments is not limited in this respect. A pattern of shifting pilot signals may be repeated for longer data fields.

Figure 5:
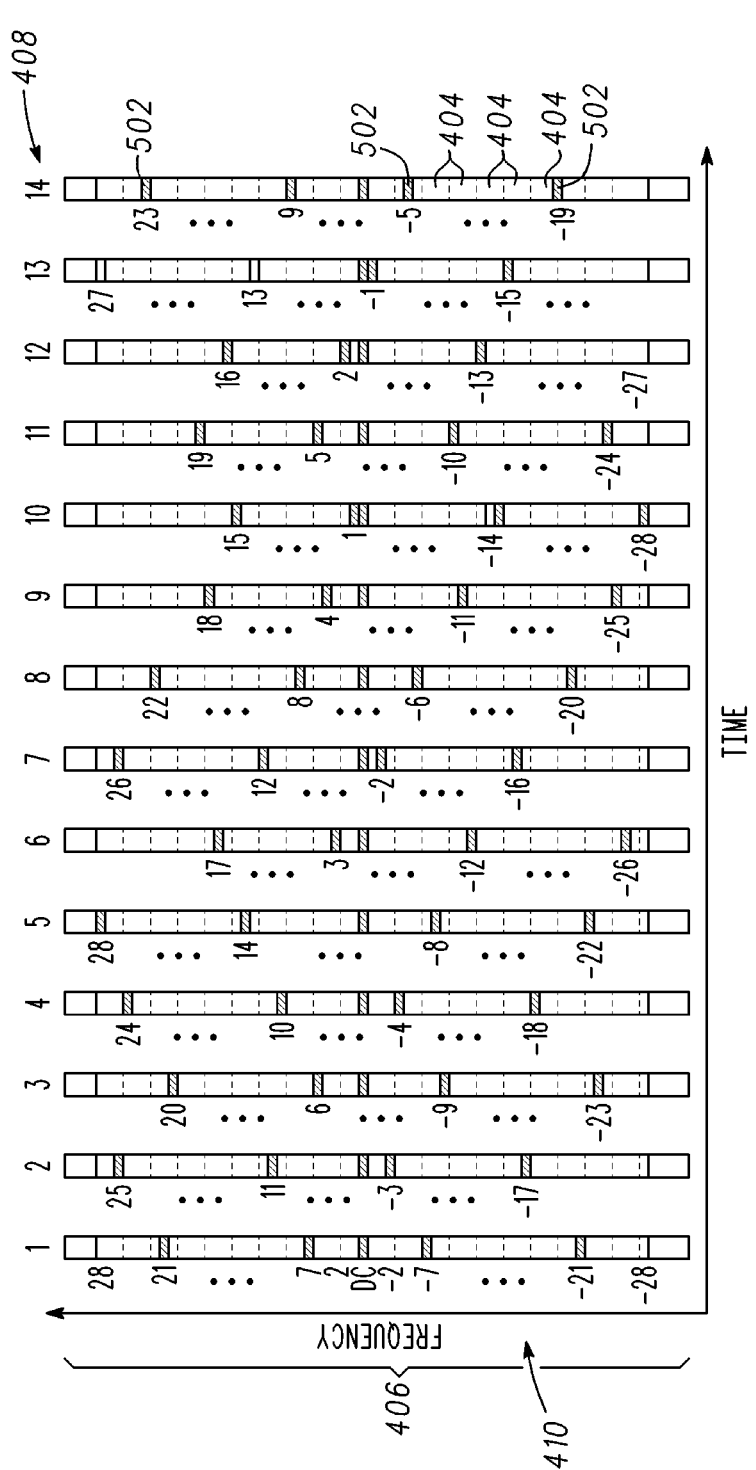
FIG. 5 illustrates non-sequentially-shifted traveling pilots in accordance with some embodiments.

FIG. 5 illustrates non-sequentially-shifted traveling pilots in accordance with some embodiments. The time-frequency structure illustrated in FIG. 5 comprises a plurality of OFDM subcarriers 410 in the frequency dimension and a plurality of OFDM symbols 408 in the time dimension. This time-frequency structure may be used to represent one data field 310 (FIG. 3) or a portion of a data field 310. The time-frequency structure illustrated in FIG. 5 may be extended in time and may be used to represent more of data fields 310. The channel bandwidth 406 may represent the bandwidth of the data fields 310 of the HEW frame 300 (FIG. 3). Each data field 310 may be a packet and may comprise a plurality of symbols 408. Traveling pilots 502 may be included within data fields 310 (FIG. 3). In these embodiments, the traveling pilots 502 are shifted non-sequentially among the OFDM subcarriers 410 for each symbol 408 of a data field 310.

In these embodiments, the traveling pilots 502 are shifted non-sequentially among subcarriers 410 from one symbol 408 to another symbol 408 of a data field 310 (i.e., shifted non-sequentially every one or more symbols). In these embodiments, a pilot signal may be shifted non-sequentially among subcarriers for each subsequent symbol (i.e., as a function of time). In the example illustrated in FIG. 5, pilot signals are transmitted on subcarriers 21, 7, −7 and −21 during symbol #1. During symbol #2, pilot signals are shifted non-sequentially and are transmitted on subcarriers 25, 11, −3 and −17. This non sequential shifting may be repeated for the other symbols of a data field 310 as illustrated FIG. 5. In the example illustrated in FIG. 5, the data field is illustrated as having only 14 symbols in time and 56 subcarriers in frequency, although the scope of the embodiments is not limited in this respect.

The bandwidth illustrated in FIGS. 4 and 5 corresponds to 20 MHz operation, however traveling pilots can be used in other bandwidths (e.g., bandwidths of 40, 80 and 160 MHz) for wider bandwidth operation. Expansion of the pattern in FIG. 4 or FIG. 5 for wider bandwidth operation is straight forward for those skilled in the art. Similarly, traveling pilots may also be used in narrower bandwidths (e.g., bandwidths of 5 MHz and 10 MHz) for narrower bandwidth operation.

Referring to FIGS. 4 and 5, in some embodiments, the traveling pilots 402/502 may comprise pilot signals that are shifted among the OFDM subcarriers in accordance with a predetermined pattern. As illustrated in FIGS. 4 and 5, the traveling pilots 402/502 may be separated by one or more data subcarriers 404. In some embodiments, the traveling pilots 402/502 may be separated by a predetermined number of data subcarriers 404, although this is not a requirement as the traveling pilots may be separated by variable number of data subcarriers 404.

In some embodiments, the master station 102 may be configured to provide an indication of the locations of the traveling pilots within the data fields. In some embodiments, the indication may be provided within the multi-device HEW preamble 312. In other embodiments, the indication may be provided in a configuration frame exchange.

In some embodiments, the actual locations in terms of symbol and subcarrier index may be provided by the master station 102, while in other embodiments, an indicator of the hopping pattern may be provided to allow the HEW stations 104 to determine the locations of the traveling pilots within the data fields. In some embodiments, the locations of the traveling pilots may be predetermined and known by the HEW stations 104 and no indication may be needed. In these embodiments, the complex value of the traveling pilots as well as the location of the traveling pilots within the data fields is known to an HEW station 104 allowing the receiver of the HEW station 104 to use the value and location of the pilots to estimate and track channel and phase for channel estimation.

In some embodiments, the traveling pilots may comprise pilot signals that may be used for phase tracking. In some embodiments, the traveling pilots may act like UE-specific reference signals in packets that are directed to a specific HEW station 104.

In some embodiments, the traveling pilots 402/502 may be shifted (e.g., either sequentially or non-sequentially) among the OFDM subcarriers 410 for each symbol 408 of a data field 310 and may be arranged to shift through each of the subcarriers 410 of the channel bandwidth 406 during transmission of a data field 310. In the example embodiments illustrated in FIGS. 4 and 5, the pilot signals that are transmitted during each symbol are shifted among the OFDM subcarriers during transmission of a packet such that each subcarrier 410 within the channel bandwidth includes a pilot signal at least once. In these examples, four pilot signals are transmitted during each symbol 408 and a pilot signal is transmitted on each of the 56 subcarriers 410 during one the 14 symbols 408.

In some other embodiments, some subcarriers 410 may be skipped. In these embodiments, the pilots do not travel to certain subcarriers. For example, the traveling pilots 402/502 may be shifted through either the odd numbered subcarriers or the even numbered subcarriers of the channel bandwidth 406 during transmission of a data field 310. This shifting pattern may be repeated within the entire data field. In the examples of FIGS. 4 and 5 that show fourteen symbols, when the traveling pilots 402/502 are shifted through either the odd numbered subcarriers or the even numbered subcarriers of the channel bandwidth 406, the pattern would be repeated every seven symbols. In these embodiments that skip subcarriers, an HEW station 104 may perform an interpolation to determine the updated channel estimate for subcarriers that do not include traveling pilots. In these embodiments, an HEW station 104 may be able to update its channel estimate faster since the pattern completes faster (i.e., within seven symbols instead of fourteen).

In some embodiments, the traveling pilots 402 may remain fixed for a predetermined number of symbols of a data field 310 and may then be shifted among the subcarriers after the predetermined number of symbols. In these embodiments, the predetermined number of symbols may be at least two. In some of these embodiments, the amount of time/number of symbols 408 that a pilot signal remains on a particular subcarrier 410 may depend on the modulation and coding scheme (MCS) used, although the scope of the embodiments is not limited in this respect. For example, for lower MCS levels, a pilot signal may remain on a particular subcarrier 410 for a longer time (i.e., for several symbols) than for higher MCS levels since the higher MCS levels may benefit more from improved channel estimates that may be obtained from the shifted pilots.

Figure 6:
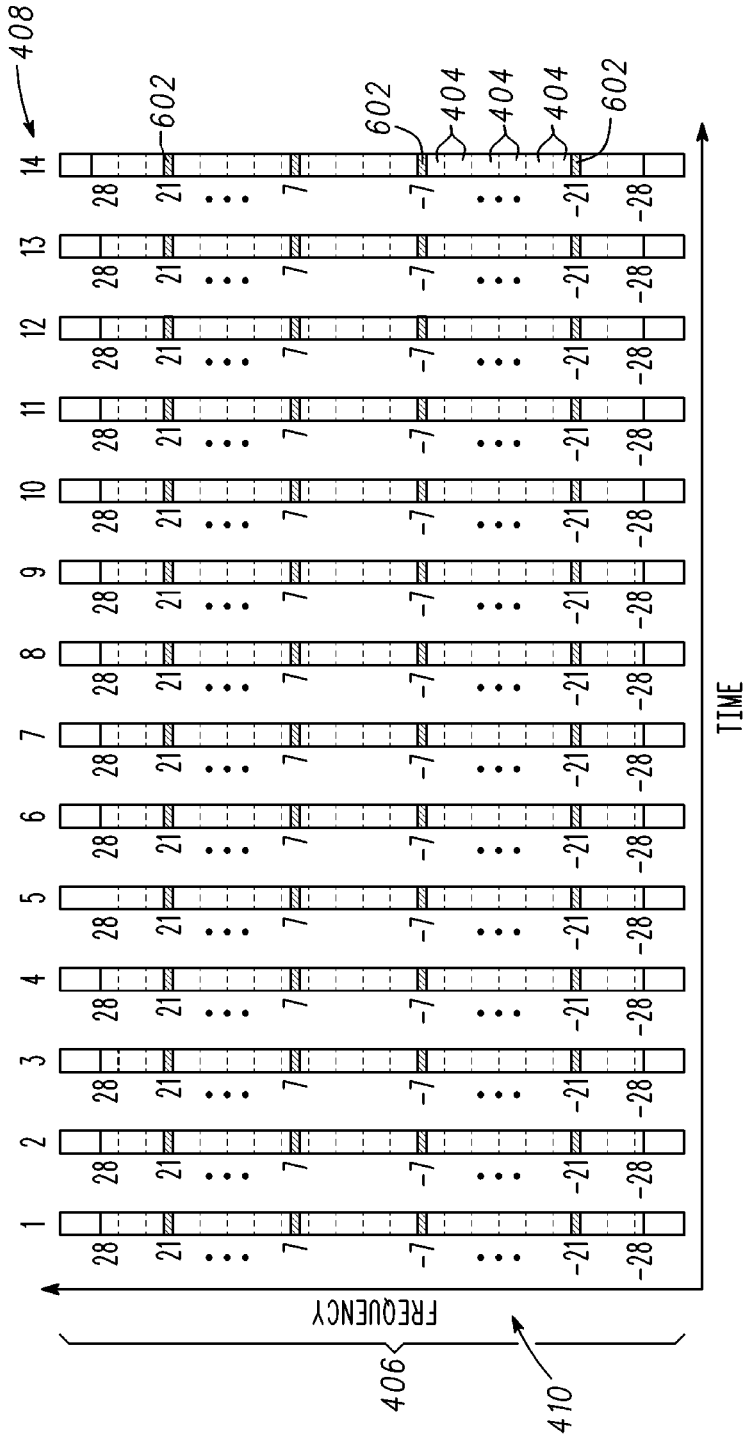
FIG. 6 illustrates fixed pilots in accordance with some embodiments.

FIG. 6 illustrates fixed pilots in accordance with some embodiments. In some of these embodiments, the master station 102 (FIG. 1) may use fixed pilots 602 for at least one initial data field 310 (i.e., data field 310A (FIG. 3)) of the HEW frame 300 and may use the traveling pilots 402/502 for later data fields (i.e., data fields 310B, 310C and 310D (FIG. 3)) of the HEW frame 300. Fixed pilots 602 remain on the same subcarrier during all OFDM subcarriers 410 for each symbol 408 and do not shift among the subcarriers. In these embodiments, the master station 102 may refrain from including traveling pilots in one or more initial data fields (e.g., data field 310A). In some alternate embodiments, all data fields 310 of HEW frame 300 may be transmitted with traveling pilots.

In some embodiments, for shorter duration HEW frames 300, the master station 102 may refrain from using the traveling pilots 402/502 and may use fixed pilots 602 within all the data fields 310. For longer duration HEW frames 300, the master station may use the traveling pilots 402/502 within most or all of the data fields 310. In these embodiments, longer duration HEW frames 300 may be HEW frames during which the channel response is determined to change sufficiently between the time an initial channel estimate is performed by a receiver (e.g., during the receipt of the LTFs in the multi-device HEW preamble 312 (FIG. 3)) and the time the data fields are to be received. In these embodiments, for shorter duration HEW frames 300, all data fields may be transmitted with fixed pilots 602. In these embodiments, for longer duration HEW frames 300, an initial data field may be transmitted with fixed pilots and the subsequent data fields may be transmitted with traveling pilots 402/502. In some embodiments, for longer duration HEW frames 300, all data fields may be transmitted with traveling pilots 402/502. In some embodiments, a shorter duration frame may be an HEW frame with a single data field. The fixed pilots 602 illustrated in FIG. 6 may also be configured for wider or narrower bandwidth operations.

In the examples illustrated in FIGS. 4-6, fourteen symbols 408 are illustrated for a data field 310 (FIG. 3), however the scope of the embodiments is not limited in this respect as a data field may comprise more symbols, including up to ten times or more as many symbols depending on the length of the HEW control period 324 (FIG. 3) and the number of scheduled HEW stations 104. In an example embodiment in which a data field has 140 symbols, the traveling pilot pattern illustrated in FIG. 4 or FIG. 5 may, for example, be repeated ten times. In some embodiments, a data field 310 may comprise over 500 symbols. For a typical internet download using a transmission control protocol (TCP), the size of packets for TCP data may be 1500 bytes and for TCP ACK may be 64 bytes. Depending on the modulation and coding scheme, the data field 310 may range from only a few symbols to up to 500 or more symbols.

Figure 7:
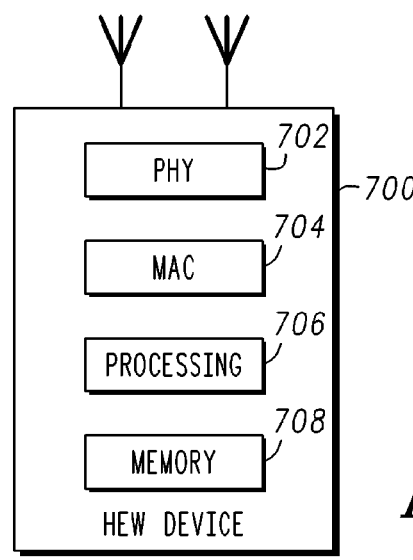
FIG. 7 is a function block diagram of an HEW device in accordance with some embodiments.

FIG. 7 illustrates an HEW device in accordance with some embodiments. HEW device 700 may be an HEW compliant device that may be arranged to communicate with one or more other HEW devices, such as HEW stations 104 (FIG. 1) or master station 102 (FIG. 1), as well as communicate with legacy devices. HEW device 700 may be suitable for operating as master station 102 (FIG. 1) or an HEW station 104 (FIG. 1). In accordance with embodiments, HEW device 700 may include, among other things, physical layer (PHY) circuitry 702 and medium-access control layer circuitry (MAC) 704. PHY 702 and MAC 704 may be HEW compliant layers and may also be compliant with one or more legacy IEEE 802.11 standards. PHY 702 may be arranged to transmit HEW frames, such as HEW frame 300

(FIG. 3). HEW device 700 may also include other processing circuitry 706 and memory 708 configured to perform the various operations described herein.

In accordance with some embodiments, the MAC 704 may be arranged to contend for a wireless medium during a contention period to receive control of the medium for the HEW control period 324 (FIG. 3) and configure an HEW frame 300 (FIG. 3). The PHY 702 may be arranged to transmit the HEW frame 300 as discussed above. The PHY 702 may also be arranged to receive an HEW frame from HEW stations. MAC 704 may also be arranged to perform transmitting and receiving operations through the PHY 702. The PHY 702 may include circuitry for modulation/demodulation, upconversion/downconversion, filtering, amplification, etc. In some embodiments, the processing circuitry 706 may include one or more processors. In some embodiments, two or more antennas may be coupled to the physical layer circuitry arranged for sending and receiving signals including transmission of the HEW frame. The memory 708 may be store information for configuring the processing circuitry 706 to perform operations for configuring and transmitting HEW frames and performing the various operations described herein.

In some embodiments, the HEW device 700 may be configured to communicate using OFDM communication signals over a multicarrier communication channel. In some embodiments, HEW device 700 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the invention is not limited in this respect as they may also be suitable to transmit and/or receive communications in accordance with other techniques and standards. In some other embodiments, HEW device 700 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, HEW device 700 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, HEW device 700 may include one or more of a keyboard, a display, a non-volatile memory port, multiple antennas, a graphics processor, an application processor, speakers, and other mobile device elements. The display may be an LCD screen including a touch screen.

The antennas of HEW device 700 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result between each of antennas and the antennas of a transmitting station.

Although HEW device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW device 700 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In some embodiments, when HEW device 700 is configured to operate as an HEW station 104 (FIG. 1), the HEW device's receiver may be arranged to receive, during an initial portion of an HEW control period 324, a master-sync transmission 322 that includes a single multi-device HEW preamble 312 this is arranged to signal and identify a plurality of data fields 310 for a plurality of HEW stations 104 that are scheduled during the HEW control period 322. At least some of the data fields 310 may have traveling pilots 402/502. The receiver may also be configured to determine an initial channel estimate based on one or more training fields (e.g., a number of LTFs) received within the multi-device HEW preamble 312 and update the initial channel estimate based on the traveling pilots 402 received within the data fields. The receiver may also be configured to receive an identified one of the data fields 310 (e.g., data field 310D) within the HEW control period 324, and demodulate data from the identified data field (e.g., data field 310D) using the updated channel estimate.

In some embodiments, the receiver may also be arranged perform phase tracking as the pilot signals are shifted through subcarriers that were previously data subcarriers. In these embodiments, an HEW station 104 is able to track the channel as it changes during the HEW control period 324 allowing an HEW station 104 that is scheduled later in the HEW control period 324 to quickly update the initial channel estimate that was determined at the beginning of the HEW control period 324 (i.e., obtained during the master-sync transmission 322).

In some embodiments, an HEW station 104 may perform an interpolation to determine channel estimates for data subcarriers 404 (FIG. 4, FIG. 5 and FIG. 6) based on the channel estimates determined for the pilot subcarriers. In some embodiments, the receiver of an HEW station 104 may include an equalizer to equalize the channel response based on the channel estimate. In these embodiments, the equalizer taps may be updated as the channel is tracked to allow an HEW station 104 to quickly update the channel estimate.

In accordance with embodiments, an HEW station 104 may update its channel estimate using the traveling pilots that are within the data field(s) intended for the station. In these embodiments, the HEW station 104 would not use the traveling pilots that are within a data field that is intended for another station to update it channel estimate. In some embodiments, an HEW station 104 may go into a low-power or power save mode during data fields that are intended for other HEW stations during the OFDMA control period 324.

In some embodiments, the master station 102 may allocate resources to scheduled HEW stations 104 for use during the HEW control period 324 based on criteria that includes one or more of signal-to-noise ratio (SNR), configuration, throughput, amount of data to send, a fairness criteria and quality-of-service requirements. The master station 102 may determine whether stations are HEW stations 104 or legacy stations 106 at the time of association with the master station 102 through a capability exchange. In some embodiments, the master station 102 may notify HEW stations 104 that the control period is to be used for communications in accordance with a multiple-access technique. In some embodiments, the master station 102 may use the control period when there is congestion and communicate in accordance with conventional Wi-Fi techniques (e.g., CSMA/CA) otherwise. In some embodiments, mapping of a control signal may be performed at the beginning of the transmission to list devices that are to communicate during the control period, although the scope of the embodiments is not limited in this respect.

The LTF that is transmitted as part of the multi-device HEW preamble 312 may be a pre-defined OFDM symbol comprising a repetition of long training sequences (LTS) and guard interval (GI) that may cover all the OFDM subcarriers. Pilot signals, on the other hand, may comprise a pre-defined signal that is assigned only to certain OFDM subcarriers of an OFDM symbol (e.g., as shown in FIGS. 4-6).

Figure 8:
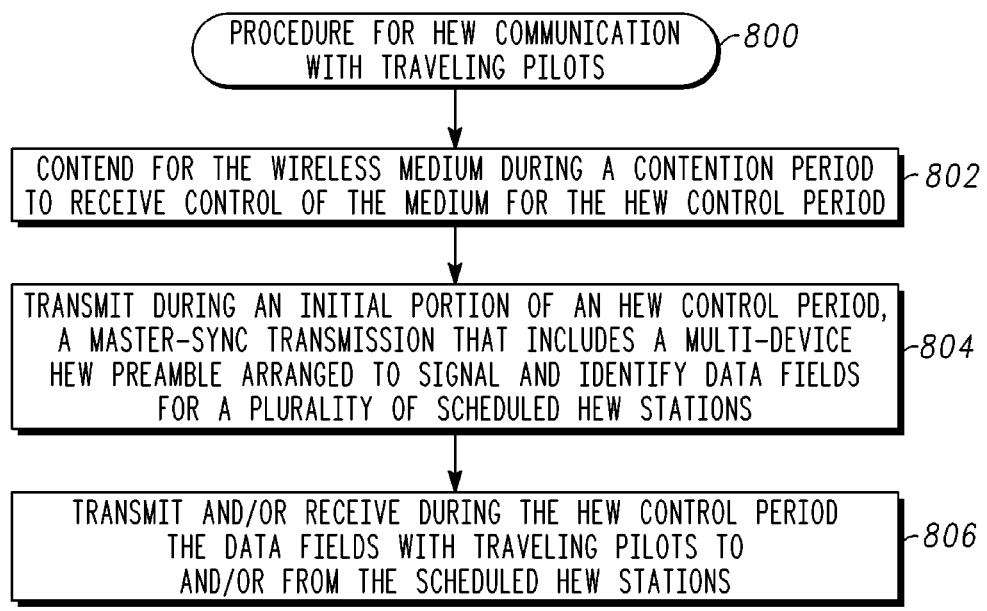
FIG. 8 illustrates a procedure for HEW communication with traveling pilots in accordance with some embodiments.

FIG. 8 illustrates a procedure for HEW communication with traveling pilots in accordance with some embodiments. Procedure 800 may be performed by a master station, such as master station 102 (FIG. 1), for communicating with a plurality of HEW devices, such as HEW stations 104 (FIG. 1), using a multi-device HEW preamble, such as HEW preamble 312 (FIG. 3), during an HEW control period 324 (FIG. 3).

Operation 802 comprises contending for the wireless medium during a contention period to receive control of the medium for the HEW control period 324. Prior to operation 802, the master station 102 may receive indications from stations that indicate which stations support HEW communication as well as other station capability information.

Operation 804 comprises transmitting, during an initial portion of an HEW control period, a master-sync transmission that includes a multi-device HEW preamble arranged to signal and identify data fields for a plurality of scheduled HEW stations.

Operation 806 comprises transmitting and/or receiving during the HEW control period the data fields to and/or from the scheduled HEW stations. At least some of the data field may include traveling pilots. The traveling pilots may comprise pilot signals that are shifted among the OFDM subcarriers in accordance with a predetermined pattern and may be separated by one or more data subcarriers. When the master station receives during the HEW control period data fields with traveling pilots from the scheduled HEW stations, the master station may be configured to update channel estimates for the scheduled HEW stations based on the traveling pilots received from the scheduled HEW stations.

In some embodiments, a master station is arranged for communicating with a plurality of stations and is configured to transmit, during an initial portion of a control period, a master-sync transmission that includes a multi-device preamble arranged to signal and identify data fields for a plurality of scheduled stations. The master station may also be configured to transmit, during the control period, the data fields with traveling pilots to the scheduled stations, the traveling pilots comprising pilot signals that are shifted among OFDM subcarriers during transmission of one or more of the data fields. In some embodiments, the master station may be an HEW master station, the stations include a plurality of HEW stations, the control period is an HEW control period, and the multi-device preamble is a multi-device HEW preamble arranged to signal and identify data fields for the scheduled HEW stations.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A master station arranged for communicating with a plurality of stations, the master station comprising: physical-layer circuitry; and medium-access control layer (MAC) circuitry configured to:

transmit, during an initial portion of a high-efficiency Wi-Fi (HEW) control period, a master-sync transmission that includes a multi-device preamble arranged to signal and identify data fields for a plurality of scheduled stations; and transmit, during the (HEW) control period, the data fields with traveling pilots to the scheduled stations, the traveling pilots comprising pilot signals that are shifted among orthogonal-frequency multiplexed (OFDM) subcarriers during transmission of one or more of the data fields.

2. The master station of claim 1 wherein the master station is further configured to include training fields in the multi-device preamble to allow each of the scheduled stations to perform an initial channel estimate, and wherein the traveling pilots are configured for use by the scheduled stations at least for updating the initial channel estimates.

3. The master station of claim 2 wherein the multi-device preamble comprises a number of long-training fields (LTFs) usable by the scheduled stations to perform the initial channel estimate, the number of LTFs being based on a number of data streams to be transmitted by the master station on a single link, and wherein each data field corresponds to one link and is configurable for transmission of one or more of the data streams.

4. The master station of claim 3 wherein the traveling pilots comprise pilot signals that are shifted among the OFDM subcarriers within a data field in accordance with a predetermined pattern, and wherein the traveling pilots are separated by one or more data subcarriers.

5. The master station of claim 4 wherein the master station is further configured to provide an indication of locations of the traveling pilots within the data fields, the indication being provided within the multi-device preamble.

6. The master station of claim 4 wherein the traveling pilots are shifted sequentially among the OFDM subcarriers for each symbol of a data field.

7. The master station of claim 4 wherein the traveling pilots are shifted non-sequentially among subcarriers for each symbol of a data field.

8. The master station of claim 4 wherein the traveling pilots are shifted among the OFDM subcarriers for each symbol of a data field and are arranged to shift through each of the subcarriers during transmission of the data field.

9. The master station of claim 4 wherein the traveling pilots remain fixed for a predetermined number of symbols and are shifted among the subcarriers after the predetermined number of symbols.

10. The master station of claim 4 wherein the master station is arranged to use fixed pilots for at least one initial data field and is arranged to use the traveling pilots for subsequent data fields transmitted during the HEW control period.

11. The master station of claim 4 wherein for a shorter duration HEW control period, the master station is arranged to refrain from using the traveling pilots and arranged to use fixed pilots within the data fields, and wherein for a longer duration HEW control period, the master station is arranged to use the traveling pilots within at least some of the data fields.

12. The master station of claim 4 wherein:
the master station is a high-efficiency Wi-Fi (HEW) master station,
the stations include a plurality of HEW stations, and
the multi-device preamble is a multi-device HEW preamble arranged to signal and identify data fields for a plurality of scheduled HEW stations.

13. The master station of claim 12 wherein the master station is further arranged to:
contend for a wireless medium during a contention period to receive control of the medium for the HEW control period; and
transmit an HEW frame during the HEW control period, wherein during the HEW control period, the master station has exclusive use of the wireless medium for communication with the scheduled HEW stations in accordance with a non-contention based multiple-access technique,
wherein each data field is associated with either a single user (SU) link or a multi-user (MU) link, each link configurable to provide multiple streams of data,
wherein the links of the HEW frame are configurable to have a same bandwidth of one of 5 MHz, 10 MHz, 20 MHz, 40 MHz, 80 MHz or 160 MHz, and
wherein outside the HEW control period, the master station is configured to communication with legacy stations in accordance with a contention-based communication technique.

14. The master station of claim 1 wherein the master station is further configured to:
receive, during the HEW control period, data fields with traveling pilots from the scheduled stations; and
update channel estimates for the scheduled stations based on the traveling pilots received from the scheduled stations.

15. A Wi-Fi station comprising: a receiver arranged to:
receive from a master station during an initial portion of a high-efficiency Wi-Fi (HEW) control period, a master-sync transmission that includes a single multi-device preamble arranged to signal and identify a plurality of data fields for a plurality of Wi-Fi stations that are scheduled during the HEW control period, at least some of the data fields having traveling pilots;
determine an initial channel estimate based on one or more training fields received within the multi-device preamble;
receive an identified one of the data fields within the HEW control period;
update the initial channel estimate based on the traveling pilots received within the identified data field; and
demodulate data received within the identified data field using the updated channel estimate,
wherein the traveling pilots comprise pilot signals that are shifted among orthogonal-frequency multiplexed (OFDM) subcarriers in accordance with a predetermined pattern.

16. The Wi-Fi station of claim 15 wherein the receiver is further arranged perform phase tracking as the pilot signals are shifted among the subcarriers.

17. The Wi-Fi station of claim 15 further comprising a transmitter to transmit a data field with traveling pilots within the HEW control period to the master station based on information received in the master-sync transmission.

18. A receiver comprising: a processor; memory coupled to the processor; and at least one radio coupled to the processor, the receiver configured to:
receive from a master station during an initial portion of a high-efficiency Wi-Fi (HEW) control period, a master-sync transmission that includes a single multi-device preamble arranged to signal and identify a plurality of data fields for a plurality of Wi-Fi stations that are scheduled during the HEW control period, at least some of the data fields having traveling pilots;
determine an initial channel estimate based on one or more training fields received within the multi-device preamble;
receive an identified one of the data fields within the HEW control period;
update the initial channel estimate based on the traveling pilots received within the identified data field; and
demodulate data received within the identified data field using the updated channel estimate,
wherein the traveling pilots comprise pilot signals that are shifted among orthogonal-frequency multiplexed (OFDM) subcarriers in accordance with a predetermined pattern.

19. The receiver of claim 18 further comprising one or more antennas coupled to the at least one radio configured for receiving the master-sync transmission and the identified one or more data fields,
wherein the receiver is further arranged perform phase tracking as the pilot signals are shifted among the subcarriers.

20. A non-transitory computer-readable storage medium that stores instructions for execution by one or more processors to configure a master station to perform operations for communicating with a plurality of high-efficiency Wi-Fi (HEW) stations, the operations comprising:
transmitting, during an initial portion of an HEW control period, a master-sync transmission that includes a multi-device HEW preamble arranged to signal and identify data fields for a plurality of scheduled HEW stations; and transmitting during the HEW control period the data fields with traveling pilots to the scheduled HEW stations, the traveling pilots comprising pilot signals that are shifted among orthogonal-frequency multiplexed (OFDM) subcarriers during transmission of one or more of the data fields.

21. The non-transitory computer-readable storage medium of claim 20 wherein the operations further comprise including training fields in the multi-device HEW preamble to allow each of the scheduled HEW stations to perform an initial channel estimate, and wherein the traveling pilots are configured for use by the scheduled HEW stations in updating the initial channel estimates.

22. The non-transitory computer-readable storage medium of claim 21 wherein the stations include a plurality of high-efficiency Wi-Fi (HEW) stations, wherein the control period is an HEW control period, and wherein the multi-device preamble is a multi-device HEW preamble arranged to signal and identify data fields for a plurality of scheduled HEW stations.

* * * * *

UNITED STATES PATENT AND TRADEMARK OFFICE
CERTIFICATE OF CORRECTION

PATENT NO. : 9,510,346 B2  
APPLICATION NO. : 14/227085  
DATED : November 29, 2016  
INVENTOR(S) : Azizi et al.

Page 1 of 1

It is certified that error appears in the above-identified patent and that said Letters Patent is hereby corrected as shown below:

On page 2, in Column 2, under "Other Publications", Line 12, after "frame", insert --structure--, therefor Signed and Sealed this  
Ninth Day of July, 2019

Andrei Iancu  
*Director of the United States Patent and Trademark Office*